United States Patent
Higuchi

(10) Patent No.: US 7,263,057 B2
(45) Date of Patent: Aug. 28, 2007

(54) ON-GROOVE RECORDATION TYPE OPTICAL DISC

(75) Inventor: Takanobu Higuchi, Tsurugashima (JP)

(73) Assignee: Pioneer Corporation, Tokyo (JP)

( * ) Notice: Subject to any disclaimer, the term of this patent is extended or adjusted under 35 U.S.C. 154(b) by 0 days.

(21) Appl. No.: 11/233,422

(22) Filed: Sep. 22, 2005

(65) Prior Publication Data
US 2006/0015887 A1    Jan. 19, 2006

Related U.S. Application Data

(62) Division of application No. 10/321,543, filed on Dec. 18, 2002, now abandoned.

(30) Foreign Application Priority Data
Jan. 21, 2002  (JP) .............................. 2002-010987

(51) Int. Cl.
*G11B 23/03* (2006.01)
*G11B 7/24* (2006.01)
(52) U.S. Cl. .................... 369/275.4; 369/284
(58) Field of Classification Search ................ 720/718; 369/284, 286, 275.4
See application file for complete search history.

(56) References Cited

U.S. PATENT DOCUMENTS

| | | | |
|---|---|---|---|
| 4,990,388 A | | 2/1991 | Hamada et al. |
| 5,194,363 A | * | 3/1993 | Yoshioka et al. ...... 430/270.13 |
| 6,723,410 B2 | * | 4/2004 | Ohno et al. ................ 428/64.1 |
| 6,844,043 B2 | * | 1/2005 | Higuchi ...................... 428/64.1 |
| 6,906,995 B2 | * | 6/2005 | Togashi et al. .............. 369/283 |
| 6,934,224 B1 | * | 8/2005 | Kuroda et al. ............. 369/13.4 |
| 6,944,116 B2 | * | 9/2005 | Nakamura et al. .......... 369/283 |
| 6,982,111 B2 | * | 1/2006 | Mizushima et al. ....... 428/64.1 |

FOREIGN PATENT DOCUMENTS

| | | | |
|---|---|---|---|
| EP | 0762407 A2 | * | 12/1997 |
| JP | 5-58046 A | | 3/1993 |
| JP | 5-101442 A | | 4/1993 |
| JP | 2002-8269 A | | 1/2002 |

* cited by examiner

*Primary Examiner*—Brian E. Miller
(74) *Attorney, Agent, or Firm*—Sughrue Mion. PLLC

(57) ABSTRACT

Hardness of a resin substrate of an optical disc is selected to be greater than hardness of a cover layer of the optical disc, at least when information is recorded on the optical disc. A laser beam is transmitted to an organic dye layer of the optical disc through the cover layer and a protection layer when information is recorded on the optical disc. The organic dye layer is sandwiched by the protection layer and a reflection layer. The substrate has grooves on its surface, and information is recorded between the grooves. The organic dye is heated and expands upon information recording, but a stress generated by the deforming organic dye layer is mainly transferred toward the cover layer. Deformation of the reflection layer and crosswrite upon information recording can be prevented. Therefore, the optical disc can record information between the grooves at a high density. Alternatively, the optical disc may be configured such that heat transfer toward the protection layer from the organic dye layer is set to be greater than heat transfer toward the reflection layer from the organic dye layer when the light beam is radiated for information recording.

14 Claims, 3 Drawing Sheets

WHEN SMALL AMOUNT OF HEAT TRANSFERS TO COVER LAYER (PROTECTION LAYER)

WHEN LARGE AMOUNT OF HEAT TRANSFERS TO COVER LAYER (PROTECTION LAYER)

ON-GROOVE RECORDATION TYPE OPTICAL DISC

This is a divisional of application Ser. No. 10/321,543 filed Dec. 18, 2002, now abandoned. The entire disclosure is hereby incorporated by reference.

BACKGROUND OF THE INVENTION

1. Field of the Invention

The present invention relates to a write once type optical disc.

2. Description of the Related Art

In general, conventional write once optical discs, such as CD-R (recordable) and DVD-R, have the following structure. A transparent, resin substrate has guide grooves on one surface of the substrate. On this surface, an organic dye is applied by spin coating. Then, a metallic reflection layer, made from for example gold, silver (or silver alloy) and aluminum (or aluminum alloy), is formed on the organic dye layer. Finally, a protection layer such as an ultraviolet ray curing resin (referred to as "cover layer") is applied on the metallic reflection layer. In order to record information on the optical disc having such structure, a laser beam for information recording is radiated on the substrate side. The laser beam decomposes the organic dye so that a refractive index changes. Heat generated by the laser beam also deforms the guide grooves and the reflection layer. As a result, pits are formed on the optical disc as recorded information.

A next generation, recordable optical disc system (referred to as "DVR" or "DVR-blue" system) has been developed recently. For the DVR (Digital Video Recorder) system, a violet laser is utilized as a light source for information recordation and retrieval, and an object lens having a high numerical aperture such as 0.85 or more is employed. A cover layer of the DVR has a thickness of about 0.1 mm, and the laser beam is radiated on the cover layer side. This suppresses an influence of optical aberration caused when the object lens having a high numerical aperture is used. This in turn increases a recording density so that a large quantity of information can be recorded on the optical disc.

A write once optical disc utilizing the DVR system is referred to as "DVR-R disc" or "DVR-blue disc". The direction of the laser beam radiation is different from the DVR-R disc compared to the conventional write once optical disc such as CD-R disc and DVD-R disc. Thus, the accumulating direction of the layers formed on the resin substrate of the DVR-R disc is opposite that of the CD-R and DVD-R. This is sometimes called a "reverse stack" structure. Further, the DVR-R disc needs a dielectric protection layer to protect the organic dye layer from a non-cured ultraviolet curing resin during formation of the cover layer. The ultraviolet curing resin forms the cover layer. Thus, the structure and manufacturing method of the DVR-R disc are different from the CD-R disc and DVD-R disc.

As understood from the above, the DVR-R disc should be manufactured with materials and structure particularly suited for the DVR-R disc.

SUMMARY OF THE INVENTION

An object of the present invention is to provide a DVR-R disc which can have smaller recordation marks (indicia) to achieve large quantity recordation.

According to one aspect of the present invention, there is provided an optical disc comprising: a resin substrate having the grooves on a surface thereof; a reflection layer formed over the surface of the resin substrate such that the reflection layer has a concavo-convex shape corresponding to the grooves; a characteristic-changeable layer formed over the reflection layer, the characteristic-changeable layer having an optical characteristic which varies when a light beam is radiated; a light-transmissive protection layer formed over the characteristic-changeable layer; and a light-transmissive cover layer formed over the protection layer for sealing the reflection layer, characteristic-changeable layer and protection layer to the resin substrate, wherein hardness of the resin substrate is greater than hardness of the cover layer, at least after the optical characteristic of the optical characteristic-changeable layer changes upon radiation of a light beam to a convex portion of the optical characteristic-changeable layer.

The characteristic-changeable layer deforms when the light beam is radiated to the characteristic-changeable layer. Since the substrate is harder than the cover layer, the substrate deforms less than the cover layer when the characteristic-changeable layer deforms. It is therefore possible to record information on the convex portion between the grooves or the optical disc at a high density.

Heat is generated at the convex portion of the characteristic-changeable layer as the light beam is radiated to the convex portion. The optical disc may be configured such that heat is transferred toward the protection layer in a greater amount than toward the reflection layer.

DETAILED DESCRIPTION OF THE INVENTION

Figure 1A:
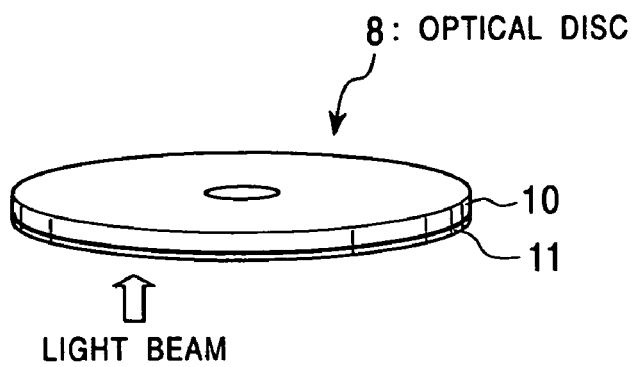
FIG. 1A illustrates a schematic overall view of an optical disc according to a first embodiment of the present invention.
Figure 1B:
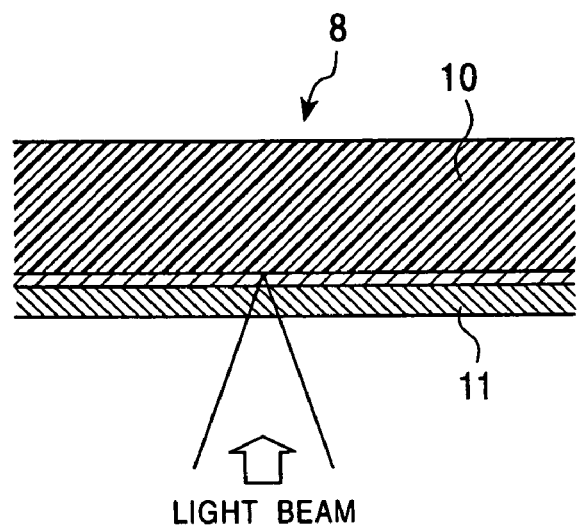
FIG. 1B illustrates a cross sectional view of the optical disc shown in FIG. 1A taken along a radius of the optical disc.
Figure 1C:
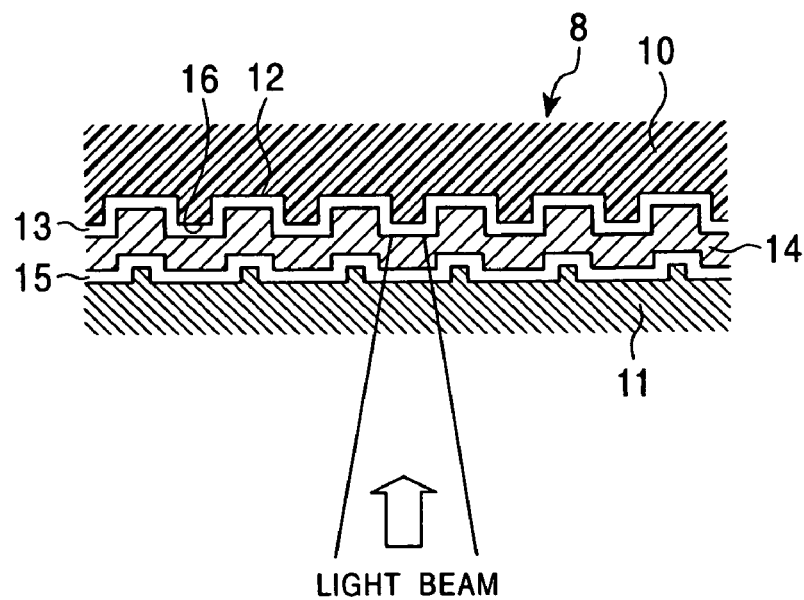
FIG. 1C illustrates an enlarged cross sectional view of an organic dye layer and neighboring layers shown in FIG. 1B.

Referring to FIGS. 1A to 1C, a DVR-R disc according to a first embodiment of the present invention will be described.

An optical disc (DVR-R disc) 8 includes a resin substrate 10, which is made from a macromolecular material such as polycarbonate and polyolefin. A plurality of grooves 12 are formed on a lower surface (i.e., the surface on which information is recorded) of the substrate 10. The grooves define information tracks between the grooves.

In this embodiment, the grooves 12 wobble to define addresses (or to provide address information) of data recorded on the disc. Specifically, projections between the grooves 12 (i.e., lands 16) are formed with a wobble, and information is recorded on a recording layer formed on the lands 16. This recordation scheme is called "on-groove recordation".

As best seen in FIG. 1C, a reflection layer 13 is formed over the grooves 12. A material of the reflection layer 13 is, for example, aluminum, aluminum alloy, silver or silver alloy. The thin reflection layer can therefore have high reflectance.

An organic dye layer 14 is applied over the reflection layer 13. The organic layer 14 is made by, for example, spin-coating an organic dye. Because the on-groove recordation scheme is employed in this embodiment, the organic dye layer 14 has to have a sufficient thickness over the lands 16 between the grooves 12.

In general, when the organic dye is applied on the grooved surface by spin coating as shown in FIG. 1C, a ratio of the organic dye layer thickness in the groove to the organic dye layer thickness on the land 16 is between approximately 2:1 and 3:2. If the organic dye layer has to have a thickness of 30 nm to sufficiently record information, then the organic dye layer thickness on the land 16 is 30 nm and the organic dye layer thickness in the groove is approximately 45-60 nm. If the groove depth is 40 nm, therefore, the groove of the substrate is entirely filled with the organic dye. Further, since the organic dye layer in the groove projects from the groove by 5-20 nm, the organic dye layer in the groove is continuous to the organic dye layer on an adjacent land 16 by the 5-20 nm thickness.

A protection layer 15 is formed over the organic dye layer 14 and a cover layer 11 is formed over the protection layer 15. The protection layer 15 protects the organic dye layer 14 from an ultraviolet curing resin of the cover layer 11. The protection layer 15 is made from a dielectric material. Specifically, the protection layer 15 is made from a metallic oxide such as $SiO_x$ and $AlO_x$ or a metallic nitride such as $SiN_x$ and $AlN_x$ because the protection layer 15 should protect the organic dye layer and be highly transparent.

The cover layer 11 is made from, for example, a macromolecular resin such as polycarbonate. The cover layer 11 is transparent since the laser beam for information recordation passes through the cover layer 11.

If hardness of the substrate 10 plus the reflection layer 13 is represented by Ha and hardness of the cover layer 11 plus the protection layer 15 is represented by Hb, then the following relationship is established in this embodiment:

$$Ha > Hb$$

The above mentioned "hardness" is an indentation hardness. For instance, the "hardness" is Brinell hardness (JIS-Z2243), Vickers hardness (JIS-Z2244), Rockwell hardness (JIS-Z2245) or pencil hardness (JIS-K5400). As will be described later, deformations of the reflection layer, substrate, protection layer and cover layer, which sandwich the organic dye layer, caused by expansion of the organic dye layer upon laser beam radiation is represented by indentation of the layers.

It should be noted that the conditional equation for the "hardness" of the optical disc layers is not limited to the above described equation in this embodiment. A refractive index of the organic dye layer changes with a temperature which elevates as the laser beam is radiated for information recordation. Before the refractive index of the organic dye layer changes (i.e., when the temperature of the organic dye layer is lower than a certain temperature T which causes a significant non-linear volumetric expansion in the organic dye layer, such as the pyrolysis temperature of the dye, the melting temperature of the dye and the sublimation temperature of the dye), the following equation may be established in this embodiment:

$$Ha \leq Hb$$

When the refractive index changes, i.e., when the temperature of the organic dye layer exceeds the temperature T, however, the following relationship should be established:

$$Ha > Hb$$

In the indentation hardness test, a surface layer (up to several tens nm from the surface) of the test material can be ignored. In this embodiment, therefore, the reflection layer 13 (approximately 20 nm in thickness) formed on the substrate 10 and the protection layer 15 (approximately 50 nm in thickness) formed on the cover layer 11 can be ignored. Accordingly, it can be assumed that the hardness Ha represents the hardness of the substrate itself and the hardness Hb represents the hardness of the cover layer itself.

Now, a manufacturing process of the DVR-R disc 8 of this embodiment will be described. It should be noted that the present invention is not limited to a particular process, material, sizes, ratios and values mentioned below.

Firstly, a master disc which has grooves to be formed on the substrate 10 was prepared by an electron-beam recorder and electron resist. A nickel stamper was then created from the master disc by electroforming.

Subsequently, a resin substrate 10 was formed from the nickel stamper by injection molding. A material of the resin substrate 10 was polycarbonate. The substrate 10 was about 120 mm in diameter, about 1.1 mm in thickness, about 40 nm in groove depth, 320 nm in track pitch, and 130 nm in land width. The land width is equal to an interval between adjacent grooves 12. Lateral walls of the groove 12 had about 90-degree inclination.

A reflection layer 13 was formed over the grooves 12 of the substrate 10. The reflection layer 13 was made from an Al—Ti alloy (Al:Ti=99:1). The reflection layer 13 having a thickness of about 20 nm was fabricated by sputtering. The reflection layer 13 has a concavo-convex shape corresponding to the a concavo-convex shape of the grooves 12.

After that, an organic dye was applied over the reflection layer 13 by spin coating such that the resulting organic dye layer 14 had a thickness of about 40 nm on each land 16 and a thickness of about 60 nm in each groove 12. A protection layer 15 was then formed over the organic dye layer 14 such that the protection layer 15 had a thickness of 50 nm. The protection layer 15 was made from aluminum nitride ($AlN_x$). The aluminum nitride was prepared by reactive sputtering, with aluminum being used as a target and Ar—N2 (10:1) used as a reactive gas.

Finally, a cover layer 11 was formed over the protection layer 15. The cover layer 11 was a polycarbonate film having an approximately 0.095 mm thickness, and fixed by a ultraviolet curing adhesive.

The DVR-R disc 8 fabricated in this manner underwent a pencil hardness test. The test showed that the substrate hardness was HB and the cover layer hardness was 2B.

Figure 2A:
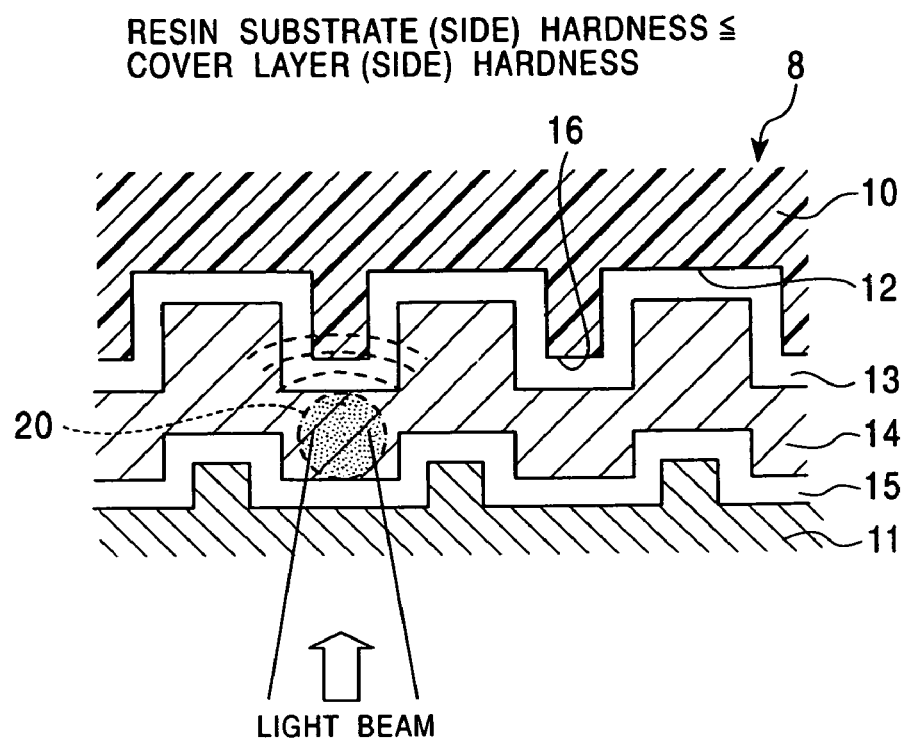
FIG. 2A illustrates a cross sectional view of a DVR-R disc to show deformations of respective layers in the DVR-R disc when information is recorded.
Figure 2B:
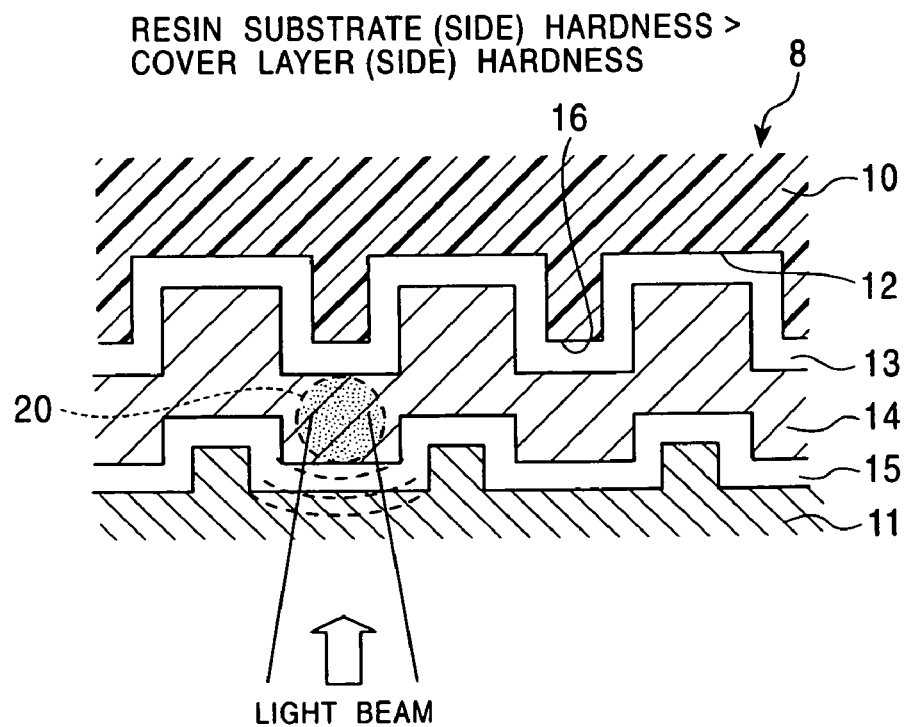
FIG. 2B is similar to FIG. 2A and illustrates deformations of respective layers in a different DVR-R disc.

Information recordation on such DVR-R disc 8 will be described with reference to FIGS. 2A and 2B that illustrate enlarged cross sectional views of two different optical discs.

As mentioned earlier, the laser beam is radiated to the cover layer 11 of the optical disc 8 when recording information on the optical disc 8 in this embodiment. The laser beam is transmitted through the cover layer 11 and protection layer 15 and converges on the organic dye layer 14 between the grooves 12 (or on the land 16), thereby forming a beam spot 20 on the land 16. At the beam spot 20, the laser beam causes the thermal decomposition of the organic dye so that the refractive index of the organic dye changes. This change of the refractive index is irreversible. Therefore, the changed refractive index does not return to the original refractive index after the laser beam radiation is finished and the temperature of the organic dye layer drops to room temperature. This is a principle of information recording on the organic dye layer 14 at the land portion 16.

When the organic dye is thermally decomposed, the volume of the organic dye expands and generates a stress in the organic dye layer 14 in and around the laser beam spot 20. Therefore, if the substrate 10 is softer than the cover layer 11, deformations caused by the stress disperse to the reflection layer 13 and substrate 10, as indicated by the phantom lines shown in FIG. 2A. In particular, the deformation of the reflection layer 13 adversely influences the information recorded on the tracks when retrieving the recorded information.

When the information is retrieved from the DVR-R disc 8, reflection of the laser beam from the reflection layer 13 is utilized. Therefore, if the reflection layer 13 has deformed, a retrieved signal includes a large distortion. Particularly, the DVR-R disc has a very small track pitch to increase a recording density, as compared with a general DVD-R. Spacing between marks, which are created on the disc when the information is recorded by the laser beam spot 20, is also small. Therefore, the deformed reflection layer is likely to affect the retrieved signal and cause crosstalk or interference between adjacent tracks.

In this embodiment, however, the resin substrate 10 is always harder than the cover layer 11, or the resin substrate 10 is harder than the cover layer 11 when the refractive index of the organic dye layer changes upon laser beam radiation. As a result, the stress generated due to volumetric expansion of the organic dye layer 14 disperses to the cover layer 11, as indicated by the phantom lines in FIG. 2B. This deforms the protection layer 15 and cover layer 11, but does not deform the reflection layer 13 and substrate 10. Consequently, the optical disc having the above described structure can prevent occurrence of crosstalk and deformation of the reflection layer 13. This structure prevents deformation of the reflection layer, which would otherwise adversely influence quality of the retrieved information.

The refractive index of the organic dye layer 14 can be set to be very close to the refractive index of the cover layer 11 (and that of the protection layer 15) because of characteristics of the material. For instance, the refractive index difference may be about 0.1-1.0. Thus, even if the cover layer 11 and protection layer 15 deform due to the stress, reflection from an interface between the cover layer 11 and the protection layer 15 is neglectable. In addition, the cover layer 11 and protection layer 15 are both transparent so that the deformed cover layer and deformed protection layer do not deteriorate the information retrieval quality.

Figure 3A:
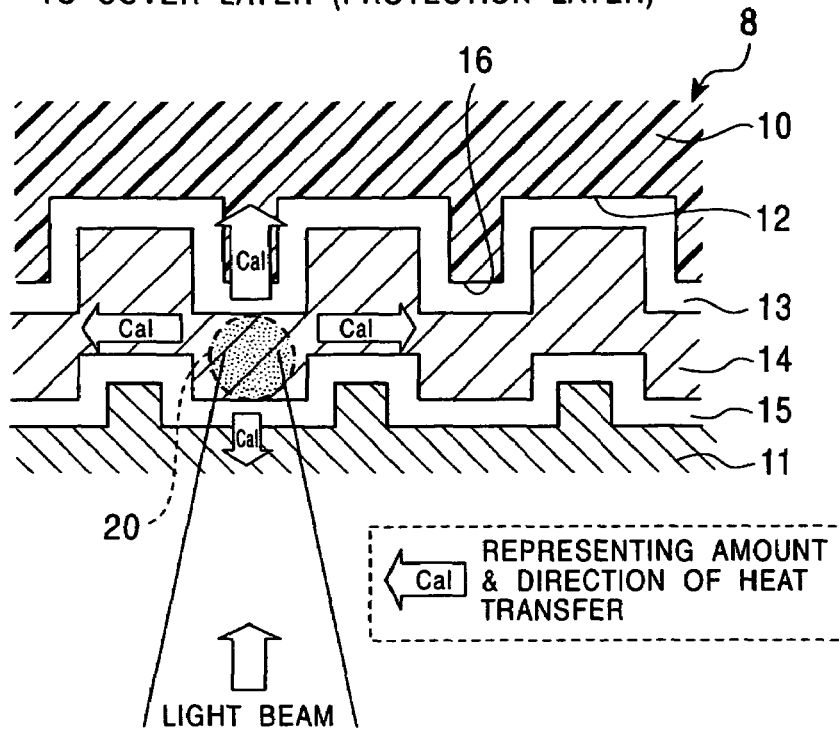
FIG. 3A illustrates a cross sectional view of a DVR-R disc to show occurrence of crosswrite when information is recorded.
Figure 3B:
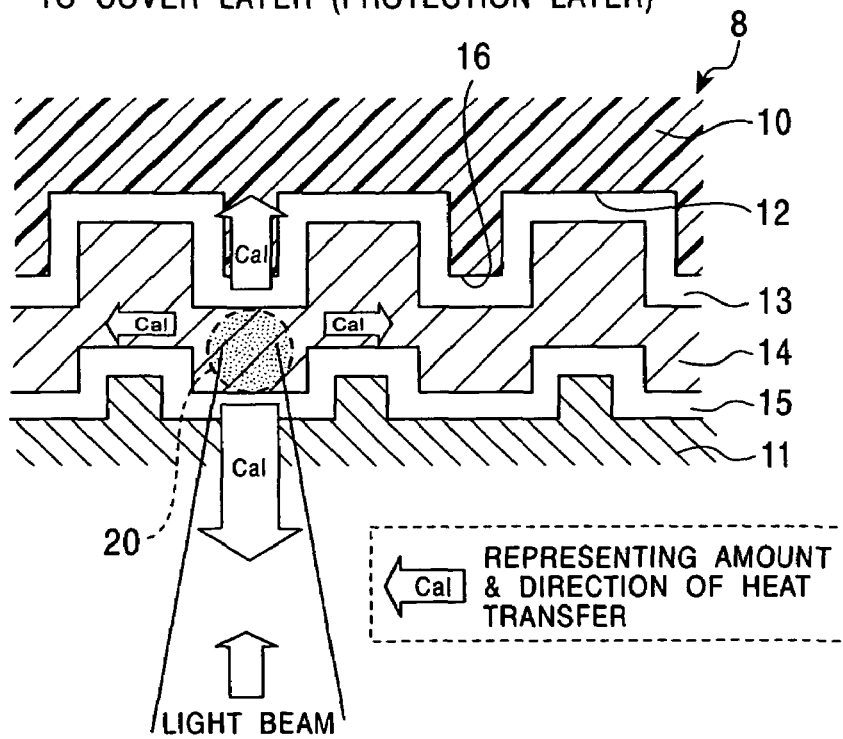
FIG. 3B illustrates a cross sectional view of a different DVR-R disc which can prevent the crosswrite.

A second embodiment of the present invention will be described with reference to FIG. 3B. The manufacturing method and structure of the DVR-R disc 8 of this embodiment are similar to those of the first embodiment so that a description therefor is omitted. FIGS. 1A to 1C are also relevant in this embodiment when the structure of the optical disc 8 is referred to. Similar reference numerals and symbols are used in FIGS. 1A, 1B, 1C, 3A and 3B.

The second embodiment is particularly directed to an optical disc which includes materials which are optimal for preventing occurrence of crosswrite. Crosswrite is a phenomenon in which the heat of the organic dye generated by the laser beam radiated during information recordation interferes with adjacent information recording tracks.

The optical disc 8 of the second embodiment records information on an organic dye layer 14 at lands 16 between grooves 12. The laser beam creates a beam spot 20 on the lands 16 for information recordation. This is an on-groove recordation scheme. The organic dye layer 14 on the land 16 is continuous to the organic dye layer 14 in the adjacent grooves 12 by a thickness of 5-20 nm in the neighboring track direction. The optical disc 8 has a metallic reflection layer 13. The reflection layer 13 is made from a material having high thermal conductivity. A contact area between the organic dye layer 14 and the reflection layer 13 is smaller on the land 16 than in the groove 12. Therefore, when the laser beam is radiated to record information on the land 16 of the optical disc 8, a limited amount of heat generated in the organic dye layer 14 on the land 16 (i.e., at the beam spot 20) is only absorbed by the reflection layer 13 as indicated by the upward unshaded arrow labeled "Cal" in FIG. 3A. Although a relatively large amount of heat is absorbed by the reflection layer 13, most of the remaining heat tends to be transferred from the beam spot 20 in the neighboring track directions (right and left in FIG. 3A) inside the organic dye layer 14.

In order to overcome this problem, the optical disc 8 of the second embodiment is configured such that the heat transfer from the beam spot 20 is greater in the laser beam radiation direction (up and down directions in FIG. 3A, and referred to as "vertical directions") than in the neighboring track directions (referred to as "horizontal directions"). The heat transfer in the vertical directions can be categorized in two directions, namely one directed to the reflection layer 13 and one directed to the protection layer 15.

Since the reflection layer 13 is made from a metal having high thermal conductivity, the amount of heat transfer toward the reflection layer 13 is relatively large. If the heat transfer toward the protection layer 15 is greater than the heat transfer toward the reflection layer 13, the sum of the heat transfer in the vertical directions (up and down directions in FIG. 3B) becomes significantly greater than the heat transfer in the horizontal directions. Such optical disc 8 is illustrated in FIG. 3B. As shown, most of the heat generated at the beam spot 20 in the organic dye layer 14 is transferred in the vertical directions, and only a small amount of heat is transferred in the horizontal directions.

Thermal conductivities of the respective layers of the optical disc 8 are not sufficient to determine an amount of heat transfer. In this embodiment, therefore, a rectangular parallelepiped extending in the vertical direction from the interface between the organic dye layer 14 and the adjacent layer (the reflection layer 13 or the protection layer 15) is used to determine an amount of heat transfer from the organic dye layer 14 in the vertical direction. The amount of heat transfer is determined by:

volume of the rectangular parallelepiped×thermal conductivity of the rectangular parallelepiped The positioning of the rectangular parallelepiped is determined as follows. The center line of the rectangular parallelepiped extends on the drawing sheet of FIG. 3B in the up and down directions, and extends through the center of the beam spot 20. The bottom of the rectangular parallelepiped is a square having a size "d"×"d" where "d" represents the diameter of the beam spot 20. There are two rectangular parallelepipeds on and below the beam spot 20. The height of the upper rectangular parallelepiped is defined by the organic dye layer-reflection layer interface and the reflection layer-substrate interface. The height of the upper rectangular parallelepiped is equal to the thickness of the reflection layer 13. The height of the lower rectangular parallelepiped is defined by the organic dye layer-protection layer interface and the protection layer-cover layer interface. The height of the lower rectangular is equal to the thickness of the protection layer 15.

In the second embodiment, the sizes of the upper and lower rectangular parallelepipeds and the materials of the respective layers of the optical disc 8 are determined such that the following equation is established:

$$Sb \times Lb \times Cb \geqq Sa \times La \times Ca$$

where Sa represents the bottom square of the upper rectangular parallelepiped, La represents the thickness of the reflection layer 13, Ca represents the thermal conductivity of the reflection layer, Sb represents the bottom square of the lower rectangular parallelepiped, Lb represents the thickness of the protection layer 15, and Cb represents the thermal conductivity of the protection layer 15.

When the above equation holds true, most of the heat generated in the organic dye layer 14 is transmitted in the vertical directions.

In general, the thickness of each layer in the optical disc 8 differs from a point at the groove bottom to a point at the groove lateral wall. Further, each layer does not have a perfectly uniform thickness on the land. In this embodiment, therefore, the thickness of the layer (La or Lb) is an average value of the thickness of the layer lying over the land.

In the second embodiment, a laser source is a violet semiconductor laser having a wavelength $\lambda=405$ nm, and an object lens has a numerical aperture NA=0.85. In general, the beam spot diameter d is given by the following equation:

$$d=0.52 \times (\lambda/NA)$$

Thus, the beam spot diameter d is almost 250 nm (d $\square$ 250 nm) in this embodiment.

The thermal conductivity of the reflection layer 13, made from an aluminum alloy, is about 240 W/m/K. The thermal conductivity of the protection layer 15, made from aluminum nitride, is about 120-200 W/m/K although the protection layer thermal conductivity varies with the method of making the protection layer and manufacturing conditions.

Amounts of heat transfer from the beam spot 20 (or the organic dye layer 14) in the vertical directions of the optical disc 8 are calculated from the above mentioned values and equation. The calculation results are shown below:

The heat transfer toward the reflection layer 13 is:

$$Sa \times La \times Ca \approx 3.9 \times 10^{-19} \text{ Wm}^2/\text{K}$$

The heat transfer toward the protection layer 15 is:

$$Sb \times Lb \times Cb \approx 4.4 \times 10^{-19} \text{ Wm}^2/\text{K}$$

From the calculation results, it is confirmed that the condition $Sb \times Lb \times Cb \geqq Sa \times La \times Ca$ is met in the DVR-R disc 8 of this embodiment. Consequently, most of the heat generated in the organic dye layer 14 diffuses in the vertical directions as shown in FIG. 3B, and therefore the crosswrite between adjacent tracks can be prevented.

It should be noted that the present invention is not limited to the above described embodiments. For example, the condition $Sb \times Lb \times Cb \geqq Sa \times La \times Ca$ is required in the second embodiment, but it is satisfactory if amounts of heat transfer in the right and left directions in FIG. 3A (i.e., the right and left unshaded arrows Cal in FIG. 3A) are reduced to prevent the crosswrite to adjacent lands. In other words, it is satisfactory if a sum of the heat transfer toward the protection layer and reflection layer is enough to prevent the crosswrite.

This application is based on a Japanese patent application No. 2002-10987, and the entire disclosure thereof is incorporated herein by reference.

What is claimed is:

1. An optical disc for recording information between grooves of the disc, comprising:
   a resin substrate having the grooves on a surface of the substrate;
   a reflection layer formed over the surface of the resin substrate such that the reflection layer has a concavo-convex shape corresponding to the grooves;
   an optical-characteristic-changeable layer formed over the reflection layer such that the optical-characteristic-changeable layer has a concavo-convex shape corresponding to the concavo-convex shape of the reflection layer, the optical characteristic-changeable layer having an optical characteristic which varies when a light beam is radiated on the optical-characteristic-changeable layer;
   a light-transmissive protection layer formed over the optical characteristic-changeable layer; and
   a light-transmissive cover layer formed over the protection layer for sealing the reflection layer, optical characteristic-changeable layer and protection layer to the resin substrate,
   wherein the light beam creates a beam spot on the convex portion of the optical-characteristic-changeable layer, such that the following equation is satisfied:

$$(Sb \times Lb \times Cb) \geqq (Sa \times La \times Ca),$$

where:
   Sb represents a square of a diameter of the beam spot,
   Lb represents a thickness of the protection layer,
   Cb represents a thermal conductivity of the protection layer,
   Sa represents the square of the beam spot diameter,
   La represents a thickness of the reflection layer, and
   Ca represents a thermal conductivity of the reflection layer,
   such that heat, which is generated at a convex portion of the optical characteristic-changeable layer by the light beam radiated to the convex portion, is transferred from the convex portion toward the protection layer in a greater amount than from the convex portion toward the reflection layer.

2. The optical disc according to claim 1, wherein the light beam is radiated to the convex portion of the optical-characteristic-changeable layer through the cover layer and protection layer in order to record information on the optical disc.

3. The optical disc according to claim 1, wherein the optical-characteristic-changeable layer is an organic dye layer which has a refractive index changeable when radiated by a light beam.

4. The optical disc according to claim 1, wherein the optical disc is a DVR-R disc.

5. The optical disc according to claim 1, wherein the substrate is about 1.1 mm in thickness and the cover layer is about 0.1 mm in thickness.

6. The optical disc according to claim 1, wherein the reflection layer is made from a material having a high thermal conductivity.

7. The optical disc according to claim 1, wherein the reflection layer is made from an aluminum alloy, and the protection layer is made from an aluminum nitride.

8. The optical disc according to claim 1, wherein the protection layer is made from SiOx, AlOx, SiNx or AlNx.

9. The optical disc according to claim 1, wherein a difference of a refractive index between the optical characteristic-changeable layer and the protection layer is between 0.1 and 1.0.

10. An optical disc in combination with a light source for recording information between grooves of the optical disc, the optical disc comprising:

a resin substrate having the grooves on a surface of the substrate;

a reflection layer formed over the surface of the resin substrate such that the reflection layer has a concavo-convex shape corresponding to the grooves;

an optical-characteristic-changeable layer formed over the reflection layer such that the optical-characteristic-changeable layer has a concavo-convex shape corresponding to the concavo-convex shape of the reflection layer, the optical characteristic-changeable layer having an optical characteristic which varies when a light beam of the light source is radiated on the optical-characteristic-changeable layer;

a light-transmissive protection layer formed over the optical characteristic-changeable layer; and a light-transmissive cover layer formed over the protection layer for sealing the reflection layer, optical characteristic-changeable layer and protection layer to the resin substrate, wherein the light beam creates a beam spot on the convex portion of the optical-characteristic-changeable layer, such that the following equation is satisfied:

$(Sb \times Lb \times Cb) \geq (Sa \times La \times Ca)$, where:

Sb represents a square of a diameter of the beam spot,
Lb represents a thickness of the protection layer,
Cb represents a thermal conductivity of the protection layer,
Sa represents the square of the beam spot diameter,
La represents a thickness of the reflection layer, and
Ca represents a thermal conductivity of the reflection layer, such that heat, which is generated at a convex portion of the optical characteristic-changeable layer by the light beam radiated to the convex portion, is transferred from the convex portion toward the protection layer in a greater amount than from the convex portion toward the reflection layer.

11. The optical disc in combination with a light source according to claim 10, wherein the light beam is radiated to the convex portion of the optical-characteristic-changeable layer through the cover layer and protection layer in order to record information on the optical disc.

12. The optical disc in combination with a light source according to claim 10, wherein the substrate is about 1.1 mm in thickness and the cover layer is about 0.1 mm in thickness.

13. The optical disc in combination with a light source according to claim 10, wherein the reflection layer is made from a material having a high thermal conductivity.

14. The optical disc in combination with a light source according to claim 10, wherein the reflection layer is made from an aluminum alloy, and the protection layer is made from an aluminum nitride.

* * * * *